United States Patent [19]

Do-Thoi et al.

[11] Patent Number: 5,387,441
[45] Date of Patent: Feb. 7, 1995

[54] METAL-CERAMIC JOINT

[75] Inventors: Tha Do-Thoi, Röthenbach/P.; Peter Stingl, Lauf-Kuhnhof, both of Germany

[73] Assignee: Hoechst CeramTec Aktiengesellschaft, Selb, Germany

[21] Appl. No.: 863,129

[22] Filed: Apr. 3, 1992

[30] Foreign Application Priority Data

Apr. 6, 1991 [DE] Germany .......................... 4111189

[51] Int. Cl.⁶ .......................... B05D 1/00; C25D 7/00
[52] U.S. Cl. .................. 427/443.2; 427/437; 427/443.1; 205/182; 205/263; 205/271; 205/291
[58] Field of Search .............. 427/443.2, 437, 443.1; 205/182, 263, 271, 291

[56] References Cited

U.S. PATENT DOCUMENTS

| | | | |
|---|---|---|---|
| 2,924,535 | 2/1960 | Schaefer | 427/443.1 |
| 4,192,686 | 3/1980 | Soltys | 427/443.1 |
| 4,996,111 | 2/1991 | Do-Thoi | 428/432 |
| 5,156,322 | 10/1992 | Do-Thoi | 228/124 |

FOREIGN PATENT DOCUMENTS 0356678  3/1990  European Pat. Off. .

OTHER PUBLICATIONS

Derwent Publications Ltd., London, GB; Class L02, AN 82-12819E and JP-A-57 003 773 (Hitachi KK) published Jan. 9, 1982.

*Primary Examiner*—Shrive Beck
*Assistant Examiner*—Vi Duong Dang
*Attorney, Agent, or Firm*—Foley & Lardner

[57] ABSTRACT

A process is described for electrolessly depositing or electrodepositing a solder layer composed of copper and silver and having an overall composition of silver/copper of from 75:25 to 70:30 and a total layer thickness of 15 to 100 μm on a metallized ceramic. In this process, copper layers and silver layers are deposited alternately on the metallized ceramic. The number of layers is at least 3 and the individual layer thickness is 5 to 10 μm.

5 Claims, No Drawings

METAL-CERAMIC JOINT

The present invention relates to a process for depositing a hard solder composed of silver and copper and having an overall composition of silver/copper in the range from 75:25 to 70:30 and a total layer thickness of 15 to 100 μm on metallized ceramic using electroless deposition or electrodeposition processes.

The problem of producing a gastight joint with high adhesive strength between metal parts, in particular metal electrodes made of copper, ®Vacon, Vacondil, niobium or steel, and insulating ceramic parts, in particular aluminum oxide, is encountered particularly in the production of electronic components such as surge arresters, housings for thyristors or vacuum switching tubes. Normally, this problem is solved by a multistage process. In the first step, the ceramic surfaces to be joined to the metal are first metallized by the conventional molybdenum/manganese or tungsten/titanium metallization process. The resultant thin metal layer having a thickness in the range from 2 to 30 μm is baked in in a moist reducing atmosphere at temperatures from 1,200° C. to 1,500° C. In this way, a good adhesion between ceramic base material and metallization can be achieved. Normally, a nickel or copper coating is then electrodeposited or electrolessly deposited on the metallization layer. The nickel or copper coating is about 0.5 to 5 μm thick and its sole purpose is to enable the metallized ceramic to be wetted by the molten solder. In the next operation, the components to be soldered are mounted in a graphite Soldering jig. A solder disk is laid on the metallized ceramic surface. The metal part to be joined to the ceramic is placed on the solder disk and then precisely centered with the aid of the soldering jig. Soldering jig, together with ceramic, metal part and solder disk are heated in protective gas or in vacuo to temperatures between 750° C. and 1,200° C. At the soldering temperature, metal surface and ceramic surface are wetted by the molten solder. The solder, solidified after cooling, produces a gastight joint with high adhesive strength between the metal and ceramic parts. In electronics, silver/copper alloys are frequently used as hard solder. Depending on the proportion by weight of copper, the melting point of said solder can be varied in the range from 780° C. (eutectic) to about 1,070° C. (pure copper).

The chemical and physical properties (thermal expansion) of the hard-solder material have to be matched to the metallization of the ceramic and the properties of the metal part. The melting point of the solder (unary system or eutectic) or its melting range (polynary system) must be in the region of the permissible processing temperature.

A disadvantage of this process, which has been employed for decades, is that fitting the solder parts (for example solder disks) during mounting is extremely labor-intensive and requires the operating staff to have special manual skill. Automation of the mounting is not possible. This applies, in particular, in the case of geometrically complicated solder joints or of components having a plurality of solder joints. Further difficulties arise as a result of the fact that small components of metallized ceramic are frequently required in high piece numbers in electronics.

German Offenlegungsschrift 3,824,900, to which reference is expressly made here, has already disclosed a process for electrolessly depositing or electrodepositing a solder layer composed of at least two layers of copper and silver on a metallized ceramic. There the total layer thickness is 15 to 300 μm. Silver/copper ratios in the vicinity of the eutectic (Ag/Cu=72:25 to 70:30) are particularly preferred because of the low melting points.

It has been found that, with very short soldering times, the eutectic is not formed in an adequate amount on the individual metal layers by diffusion, with the result that vacuum tightness and adhesive strength are inadequate.

The object of the invention was to develop a novel process for depositing a solder layer, which process is suitable, on the one hand, to be used on automatically operating assembly units but which, on the other hand, results in satisfactory vacuum tightness and adequate adhesive strength despite short soldering times.

This object was achieved by a process of the generic type mentioned at the outset, whose defining feature is to be perceived in the fact that copper layers and silver layers are applied alternately to the metallized ceramic, the number of layers being at least three and the individual layer thicknesses being in the range from 5 to 10 μm.

The process is suitable for the presoldering of metallized ceramic parts, preferably aluminum oxide parts. It is also possible first to deposit a layer of nickel having a layer thickness of 0.5 to not more than 5 μm, in addition, on the metallization.

Preferably, the solder layer is composed of at least 4, in particular at least 6, individual metal layers. The total thickness of the solder layer is 15 to 100 μm, preferably 20 to 80 μm.

We claim:

1. A process for electrolessly depositing or electrodepositing a solder layer composed of copper and silver and having an overall composition of silver/copper of from 75:25 to 70:30 and a total layer thickness of 15 to 100 μm on a metallized ceramic, which comprises applying copper layers and silver layers alternately to the metallized ceramic, the number of layers applied being at least 6 and the individual layer thicknesses being in the range from 5 to 10 μm.

2. The process as claimed in claim 1, wherein the total thickness of the solder layer is in the range from 20 to 80 μm.

3. The process as claimed in claim 1, wherein a layer of nickel is first deposited, in addition, on the metallization.

4. The process as claimed in claim 3, wherein the nickel layer has a layer thickness in the range from 0.5 to 5 μm.

5. The process as claimed in claim 1, wherein an aluminum oxide ceramic is used as ceramic.

* * * * *